US005620707A

United States Patent [19]
Sanker et al.

[11] Patent Number: 5,620,707
[45] Date of Patent: Apr. 15, 1997

[54] BEADLETS FOR CUSTOMIZATION OF FLAVOR AND SWEETENER IN A BEVERAGE

[75] Inventors: Lowell A. Sanker, Montgomery; Liezl G. Peterson, Cincinnati; James G. Upson, Springdale, all of Ohio

[73] Assignee: The Procter & Gamble Company, Cincinnati, Ohio

[21] Appl. No.: 609,411

[22] Filed: Mar. 1, 1996

Related U.S. Application Data

[63] Continuation of Ser. No. 312,843, Sep. 27, 1994, abandoned, which is a continuation-in-part of Ser. No. 85,222, Jun. 29, 1993, Pat. No. 5,370,864.

[51] Int. Cl.$^6$ .............................. A61K 9/50; A61K 9/16; A23F 5/12; A23F 5/38
[52] U.S. Cl. ................... 424/489; 424/490; 424/451; 424/464; 426/85; 426/96; 426/534; 426/590; 426/594; 426/548
[58] Field of Search ............................ 424/451, 464, 424/490, 489; 426/85, 96, 534, 590, 594, 548

[56] References Cited

U.S. PATENT DOCUMENTS

| | | |
|---|---|---|
| 3,620,759 | 11/1971 | Maddox . |
| 4,004,039 | 1/1977 | Shoaf et al. . |
| 4,158,068 | 6/1979 | von Rymon Lipinski et al. .... 426/548 |
| 4,251,195 | 2/1981 | Suzuki et al. ................... 425/6 |
| 4,276,312 | 6/1981 | Merritt . |
| 4,312,889 | 1/1982 | Melsheimer .................... 426/86 |
| 4,422,985 | 12/1983 | Morishita et al. ............... 264/4.4 |
| 4,426,337 | 1/1984 | Suzuki et al. ................... 264/4 |
| 4,481,157 | 11/1984 | Morishita et al. ............... 264/4.1 |
| 4,695,466 | 9/1987 | Morishita et al. ............... 424/456 |
| 4,925,683 | 5/1990 | Fischbach et al. ............... 426/103 |
| 4,992,282 | 2/1991 | Mehansho . |
| 5,004,595 | 4/1991 | Cherukuri et al. ............... 424/48 |
| 5,286,496 | 2/1994 | Stapler et al. .................. 424/490 |
| 5,300,305 | 4/1994 | Stapler et al. .................. 424/490 |
| 8,085,222 | 6/1993 | Peterson et al. . |

FOREIGN PATENT DOCUMENTS

| | | |
|---|---|---|
| 0332175 | 9/1989 | European Pat. Off. . |
| 61-58537 | 3/1986 | Japan .................. A23F 5/36 |
| 2-113863 | 4/1990 | Japan .................. A23L 1/03 |
| 1060258 | 3/1967 | United Kingdom ............. A61K 3/00 |

OTHER PUBLICATIONS

Goshi–Kaisha Miduri JPN. 57 149 238 (Sep. 14, 1982).
Petersen et al GA. 122:64040 of U.S. 5370864 Dec. 6, 1994.
Stapler et al GA. 120: 200201 of U.S. 5286496 Feb. 15, 1994.
Szente GA. 105: 132375 J Food Sci 51(4):1024–7(1986).
Yamada et al GA. 105:41567 of JP 61058537 (Mar. 25, 1986).
Pons GA. 83:136928 of FR 2241291 (Mar. 21, 1975).
Balassa GA. 72:99377 of U.S. 3495988 (Feb. 17, 1970).
O'Dell GA. 78:83000 of Food Process Ind. 41:36, 45(1972).
Jackson, L. S. et al.; "*Microencapsulation and the Food Industry*"; Lebensm.–Wiss. u.–Technol.; vol. 24, pp. 289–297 (1991) flavors & sweetener.
Product Update: "*Encapsulated Ingredients*"; IFP, Inc.; Apr. 1988; Food Technology; pp. 158–159 flavors.
Mutka, J. R. et al.; "*Preparation of Encapsulated Flavors with High Flavor Level*"; Food Technology; pp. 154–157; Apr. 1988 flavors.
"*Flavor Encapsulation*", American Chemical Society Symposium; Series 370, 1988 flavors.

*Primary Examiner*—Shep K. Rose
*Attorney, Agent, or Firm*—Eric W. Guttag; J. C. Rasser

[57] ABSTRACT

A beadlet suitable for flavoring a beverage comprising a shell material and core composition suitable for ingesting comprising: (a) from about 0.1 mg to about 400 mg of a flavor component; and (b) from about 0.02 mg to about 450 mg of a sweetener component comprising: (1) acetosulfame; and (2) a second artificial sweetener selected from the class of the aspartyl peptide esters, the sulfamate sweeteners, the sulfimide sweeteners, the dihydrochalcone sweeteners and the ammoniated glycyrrhizins and mixtures thereof; wherein the ratio by weight of (1) to (2) is from about 1:15 to about 15:1; and wherein the beadlet core contains from about 15 mg to about 2,000 mg of material.

11 Claims, No Drawings

BEADLETS FOR CUSTOMIZATION OF FLAVOR AND SWEETENER IN A BEVERAGE

This is a continuation of application Ser. No. 08/312,843, filed on Sep. 27, 1994, now abandoned which is a continuation-in-part of Ser. No. 08/085,222, filed Jun. 29, 1993 (now U.S. Pat. No. 5,370,864, issued Dec. 6, 1994); which is incorporated herein by reference.

FIELD

The present invention relates to flavor compositions which enable customization of flavor-type and flavor-intensity in individual servings of a beverage.

BACKGROUND

Individual consumers have a variety of individual tastes, particularly with regard to their preferred flavorings of beverages. However, due to limitations relating to production abilities, shipping quantities and shelf space, a manufacturer is typically limited as to the variety of flavored beverages he or she can provide the consumer. Furthermore, there are some instances where the consumer desires to "create" there own unique flavor combination rather than be limited to the choices provided by the beverage manufacturer.

Based on the foregoing, there is a need for a flavoring vehicle which circumvents the need for providing an unlimited variety of flavored beverages and gives the consumer a variety of flavor-type and flavor-intensity options for his or her beverage.

It is an object of the present invention to provide a flavoring vehicle in the form of a beadlet comprising an ingestible flavor and sweetener.

It is also an object of the present invention to provide such a beadlet, one or more of which are easily added to a single serving of a beverage, dependent upon the consumer's desired flavor-type and flavor-intensity.

These and other objects of the present invention will become evident to those skilled in the art from a reading of the present disclosure with the appended claims.

SUMMARY

The present invention is directed to a beadlet suitable for flavoring a beverage comprising a shell material and core composition suitable for ingesting comprising: (a) from about 0.1 mg to about 400 mg of a flavor component; and (b) from about 0.02 mg to about 450 mg of a sweetener component comprising: (1) acetosulfame; and (2) a second artificial sweetener selected from the class of the aspartyl peptide esters, the sulfamate sweeteners, the sulfimide sweeteners, the dihydrochalcone sweeteners and the ammoniated glycyrrhizins and mixtures thereof; wherein the ratio by weight of (1) to (2) is from about 1:15 to about 15:1; and wherein the beadlet core contains from about 15 mg to about 2000 mg of material. Such a beadlet satisfies the need for flavoring vehicle which circumvents the need for providing an unlimited variety of flavored beverages. Such a beadlet also satisfies the need for a means of easily adding a flavor to a beverage by the consumer, which provides the consumer with flexibility as to the flavor-type and intensity of the beverage.

DETAILED DESCRIPTION

"Comprising" means that other steps and other ingredients which do not affect the end result can be added. This term encompasses the terms "consisting of" and "consisting essentially of".

All percentages are by weight of total composition unless specifically stated otherwise.

All ratios are weight ratios unless specifically stated otherwise.

The present invention relates to a beadlet suitable for flavoring individual servings of a beverage comprising a shell material and core composition suitable for ingesting. The essential as well as optional components of the beadlets of the present invention are described in the following paragraphs.

Beadlet Shell Material

The shell material of the beadlets of the present invention can be any materials which are suitable for ingestion. Materials which are suitable include gelatin, polyvinyl alcohols, waxes, gums, sucrose esters and sugar candy type materials used in cough drops and mints, for example.

The shell material is used to form any of a wide variety of shapes such as spheres, oblong shapes, disks, puffed squares and cylinders. The shell thickness is preferably in the range of about 30 μm to about 2,000 μm, more preferably from about 70 μm to about 200 μm, more preferably still from about 100 μm to about 180 μm. If the beadlets are spherical, the diameter is generally in the range of from about 2 mm to about 15 mm, more preferably from about 2.5 mm to about 12 mm, more preferably from about 3 mm to about 11 mm, more preferably from about 4 mm to about 9 mm, more preferably from about 5 mm to about 7 mm.

Preferably the beadlets contain from about 15 mg to about 2000 mg of core material, more preferably from about 60 mg to about 600 mg, more preferably from about 75 mg to about 300 mg, more preferably from about 100 mg to about 200 mg, more preferably from about 125 mg to about 150 mg.

Preferably the beadlets are seamless. A method for making such a seamless beadlet is disclosed in U.S. Pat. No 4,426,337, Suzuki, Matsumura, Maeda, Imai and Kurokawa, issued Jan. 17, 1984, incorporated herein by reference.

Flavor Component

The flavor component of the present invention may be natural or artificial in origin. Preferred flavorings include, but are not limited to, Almond Nut, Amaretto, Anisette, Apple, Brandy, Cappuccino, Chamomile, Cherry, Chocolate, Chocolate Mint, Cinnamon, Cinnamon Almond, Cinnamon-Spice, Creme, Creme de Menthe, French Vanilla, Grand Mariner, Grape, Herb blends, Irish Creme, Kahlua, Lemon, Macadamia Nut, Orange, Orange Leaf, Peppermint Stick, Peach, Pistachio, Raspberry, Sambuca, Strawberry, Tea, and Vanilla bean.

Preferably the beadlet core contains from about 0.1 mg to about 400 mg of flavor, more preferably from about 2 mg to about 120 mg, more preferably still from about 5 mg to about 20 mg.

Sweetener Component

The volume limitations inherent in the use of the beadlets of the present invention requires careful selection of the amount and type of materials contained therein. Without being limited by theory, it has been discovered that the use of a specific sweetener component in the present invention provides increased actual and/or perceived sweetness as well as improving the sweetness perception in the beverage. This combination of certain specific sweeteners provides an optimized sweetness profile and/or sweetness intensity in the beadlets of the present invention.

The sweetener component of the present invention is a sweetener mixture having an improved sweetness intensity and/or profile comprising:

(a) acetosulfame and (b) a second artificial sweetener selected from the class of the aspartyl peptide esters, the sulfamate sweeteners, the sulfimide sweeteners, the dihydrochalcone sweeteners and the ammoniated glycyrrhizins and mixtures thereof.

These sweetener combinations are more fully described in U.S. Pat. No. 4,158,068 to Von Rymon Lipinski et al., issued Jun. 12, 1979, incorporated by reference herein.

Acetosulfame is a potassium salt. In principle it could be replaced by other non-toxic water-soluble salts, especially the sodium and calcium salt of 3,4-dihydro-6-methyl-1,2,3-oxathiazine-4-one-2,2-dioxide, but these salts do not bring about any advantages in comparison with the potassium salt.

The most important representatives of the second (b) sweetener classes are mainly the aspartyl phenyl alanine methyl ester (an aspartyl dipeptide ester) and the non-toxic water-soluble salts, especially the sodium and calcium salt, of cyclohexyl sulfamic acid (sulfamate sweeteners), saccharin and its non-toxic water-soluble salts, especially saccharin-Na (sulfimide sweeteners), the neohesperidin and naringine dihydrochalcones (dihydrochalcone sweeteners) and the ammoniated glycyrrhizins, especially monoammonium glycyrrhizin. One or more of these sweetener types may be mixed with acetosulfame.

The components of the mixture (a) and (b) can be mixed in any possible ratio; however, they are preferably mixed in a ratio inverse to their sweetening powers. The sweetening powers are generally determined in comparison with saccharose, for example, in the manner described in the journal CHEMIE IN UNSERER ZEIT, pages 142–145 (1975). The following weight ratios of the sweetener components have been found to be advantageous:

acetosulfame/aspartyl phenyl alanine methyl ester in a ratio of 1:10 to 10:1, especially of about 3:1 to 1:2.

acetosulfame/sodium cyclamate in a ratio of about 3:1 to 1:12, especially of about 1:2 to 1:12 .

acetosulfame/saccharin-Na in a ratio of about 1:2 to 10:1, especially of about 1:1 to 8:1, preferably 1:1 to 3:1.

acetosulfame/neohesperidin-dihydrochalcone in a ratio of about 5:1 to 20:1, especially of about 8:1 to 25:1.

Preferred for use in the beadlet core is a sweetener component comprising acetosulfame/saccharin-Na/aspartyl phenyl alanine methyl ester and more preferably further comprising monoammonium glycyrrhizin.

Also useful in either the core or shell of the beadlets are additional sweeteners such as caloric sweeteners, e.g., sucrose, d-fructose and d-xylose, the amino acid sweeteners such as glycine as well as the glycosides such as stevioside.

While the sweetener component of the present invention is generally contained in the core of the beadlet, it can be contained in the shell and preferably is in both the core and the shell of the beadlet. Most preferred for use in the beadlet shell is a mixture of acetosulfame/saccharin-Na/aspartyl phenyl alanine methyl ester, especially in a ratio of about 28:6:1.

Preferably the beadlet core contains from about 0.02 mg to about 450 mg of sweetener, more preferably from about 1 mg to about 240 mg, more preferably still from about 3 mg to about 25 mg.

Diluents for Use in Beadlet Core

The solubilizing agent for the flavor and sweetener used in the cores of the present beadlets can be any of a number of materials. Preferred are oils such as corn, olive, rapeseed, sesame, peanut or sunflower. Other preferred materials are triglycerides such as Caprex 300 and polyethylene glycols such as PEG 400. These are used in an amount of from about 20% to about 80%, preferably from about 35% to about 70% of the total capsule weight.

Method of Manufacture

The capsules of the present invention can be made using a variety of techniques. One method is described after the following examples.

Industrial Applicability

The beadlets of the present invention are used by placing one or more capsules into a serving of a beverage. While the beadlets may be used to flavor essentially any type of beverage, typically they are used to flavor beverages such as coffee, tea, carbonated soft drinks and water. The beadlets will readily dissolve in the beverage, releasing the flavor and sweetener, thereby producing an aromatic and flavorful artificially sweetened beverage. Preferably the beadlets will release the core (i.e., the shell will break and/or dissolve) within 60 seconds of being submerged in the beverage, more preferably within 45 seconds, more preferably within 30 seconds, more preferably within 20 seconds, more preferably within 10 seconds.

The user can readily customize their serving of beverage to the desired flavor and sweetener concentration by increasing the number of beadlets to be added to the beverage. Preferably 1 to 5 beadlets are added to an 8 oz. beverage to achieve a satisfactory flavoring/sweetening level, more preferably 1–3 beadlets are added.

The following examples further describe and demonstrate preferred embodiments within the scope of the present invention. The examples are given solely for the purposes of illustration and are not to be construed as illustrative of limitations of this invention. Many variations thereof are possible without departing from the invention's spirit and scope.

EXAMPLES 1–5

The following compositions/capsules are representative of the present invention.

| Component | 1 | 2 | 3 | 4 | 5 |
|---|---|---|---|---|---|
| | Weight % | | | | |
| Gelatin | 6.920 | 11.484 | 10.486 | 8.589 | 7.830 |
| Sorbitol Solution (70% Aqueous, Ex. 1–2; Crystalline, Ex. 4–5) | 4.938 | 4.362 | — | 2.845 | 2.375 |
| Saccharin | 0.277 | 0.500 | 0.372 | 0.450 | 0.538 |
| Acetosulfame | 0.460 | 0.644 | 0.748 | 1.458 | 1.238 |
| Aspartyl phenyl alanine methyl ester | 0.460 | 0.345 | 0.250 | — | 0.577 |
| Monoammonium glycyrrhizin | 0.031 | 0.030 | 0.025 | — | — |
| Neohesperidin dihydrochalcone | — | — | — | 0.015 | — |
| FD&C Blue #1 | — | — | 0.046 | — | — |

| Component | 1 | 2 | 3 | 4 | 5 |
|---|---|---|---|---|---|
|  | Weight % | | | | |
| FD&C Yellow #5 | — | — | — | — | — |
| FC&D Red #40 | 0.001 | 0.003 | — | — | 0.012 |
| Caramel Color[1] | 0.015 | — | — | 0.120 | — |
| Captex 300[2] | 6.154 | 10.206 | 11.684 | 9.332 | 9.345 |
| Chocolate Mint Flavor | 4.550 | — | — | — | — |
| Cinnamon Flavor | — | 15.250 | — | — | — |
| French Vanilla Flavor | — | — | — | 6.264 | — |
| Amaretto Flavor | — | — | — | — | 10.684 |
| Grape Flavor | — | — | 8.457 | — | — |
| Citric Acid | — | — | 0.500 | — | 0.180 |
| Propylene Glycol | 1.538 | 2.435 | 7.638 | — | — |
| Glycerin | 0.305 | — | 1.021 | 3.584 | 4.225 |
| Polyethylene Glycol 400 | 32.123 | 25.820 | 31.245 | 26.284 | 27.746 |
| Sucrose Acetate Isobutyrate | 38.941 | 27.249 | 25.703 | 38.559 | 31.710 |
| Water | 3.287 | 1.672 | 1.825 | 2.500 | 3.540 |

[1]Available from Williamson Food Ingredients, Louisville, Kentucky.
[2]Captex 300 is a triglyceride supplied by Capitol City Product, Columbus, Ohio.

The above compositions are prepared by mixing the components of the core in one container and the components of the shell(s) in another container. The shell(s) materials are heated to provide a fluid medium. The core and shell(s) materials are then pumped separately to a two or three fluid nozzle submerged in an organic carrier medium. The beadlets formed are allowed to cool and stiffen. They are then dried and separated for further handling.

Sufficient quantities of ingredients are combined to form cores containing 15 mg, 60 mg, 75 mg, 100 mg, 125 mg 150 mg, 300 mg, 600 mg and 2,000 mg of material for each of Examples 1–5.

In the above compositions any of a wide variety of other shell materials, flavors, sweeteners as well as other components may be used in place of or in combination with the components listed above.

The previously described embodiments of the present invention have many surprising advantages, including providing the consumer with "flavor flexibility". Such a beadlet circumvents the need for providing an unlimited variety of flavored beverages. The consumer can be provided with an "unflavored" beverage and a variety of flavor beadlets. Such a combination drastically reduces the beverage production costs (only one type of beverage, unflavored, need be manufactured), shipping costs (the beadlets are significantly less bulky and weigh less than the beverage or beverage mix), and shelf space (space merely needs to be provided for the unflavored beverage and the beadlets which take up significantly less space than a variety of flavored beverages).

A consumer can choose from a desired flavor from a beadlet "variety pack" and adjust the flavor intensity by the number of beadlets to be added. The consumer can further combine beadlets of different flavorings to produce a unique flavor combination.

The flavor and sweetener are presolubilized in a liquid form in the core. This allows for rapid dissolution when added to the beverage. The beadlets also deliver a much greater payload of flavor and sweetener versus smaller microcapsules (e.g, capsules having a diameter of 1 mm or less, and/or a core of 0.3 mg or less ).

The beadlets provide oxidation protection for the flavor and sweetener materials in the core. The gelatin capsule also provides hygroscopic protection for the core material.

The beadlets are easily portable and can be contained in an easy to use dispenser. The beadlets relatively large size makes it easy for the consumer to grasp and select the exact number of beadlets to be added to the beverage.

The beadlets further provide an aesthetic appeal. Each beadlet appears as a shiny, brilliant colored sphere, which is clear. The sphere color can be used to indicate the flavor type, e.g., green for mint, red for cinnamon, pink for strawberry, light caramel or clear for vanilla, etc. In contrast, the smaller microcapsules appear as a small rod or sphere (similar in appearance to sugar granules), or powder, and generally have limited color characteristics.

All publications and patent applications mentioned hereinabove are hereby incorporated in their entirety by reference.

It is understood that the examples and embodiments described herein are for illustrative purposes only and that various modifications or changes in light thereof will be suggested to one skilled in the art and are to be included in the spirit and purview of this application and scope of the appended claims.

What is claimed is:

1. A spherical beadlet having a diameter of from about 3 mm to about 11 mm suitable for flavoring a coffee beverage comprising a shell material and an ingestible core composition in presolubilized liquid form consisting essentially of:

(a) from about 0.1 mg to about 400 mg of a flavor component selected from the group consisting of almond nut, amaretto, anisette, apple, brandy, cappuccino, chamomile, cherry, chocolate, chocolate mint, cinnamon, cinnamon almond, cinnamon-spice, creme, creme de menthe, french vanilla, grand marnier, grape, herb blends, Irish creme, kahlua, lemon, macadamia nut, orange, orange leaf, peppermint stick, peach, pistachio, raspberry, sambuca, strawberry, tea, and vanilla bean; and (b) from about 0.02 mg to about 450 mg of a sweetener component consisting essentially of:
   (1) acetosulfame; and
   (2) a second artificial sweetener consisting of an aspartyl peptide ester sweetener, a sulfimide sweetener, and an ammoniated glycyrrhizin;

wherein the ratio by weight of (1) to (2) is from about 1:15 to about 15:1; and wherein the beadlet core contains from about 75 mg to about 650 mg of material.

2. The beadlet of claim 8 wherein the shell material is selected from the group consisting of polyvinyl alcohol, gelatin, waxes, gums and sugar candies.

3. The beadlet of claim 2 wherein the shell wall thickness is from about 30 μm to about 2,000 μm.

4. The beadlet of claim 3 wherein the shell material is gelatin.

5. The beadlet of claim 4 wherein the beadlet is made using a three fluid nozzle.

6. The beadlet of claim 4 wherein the beadlet is made using a two fluid nozzle.

7. The beadlet of claim 2 wherein the sweetener component is incorporated into the beadlet core.

8. The beadlet of claim 1 wherein the sweetener component consists essentially of a mixture of acetosulfame, saccharin-Na, aspartyl phenyl alanine methyl ester and monoammonium glycyrrhizin.

9. A method for flavoring a coffee beverage comprising adding one or more beadlets of claim 1 to a coffee beverage.

10. A method for flavoring a beverage comprising adding one or more beadlets of claim 8 to a beverage.

11. The method of claim 8 wherein the beverage is a carbonated beverage.

* * * * *